Patented Aug. 23, 1932

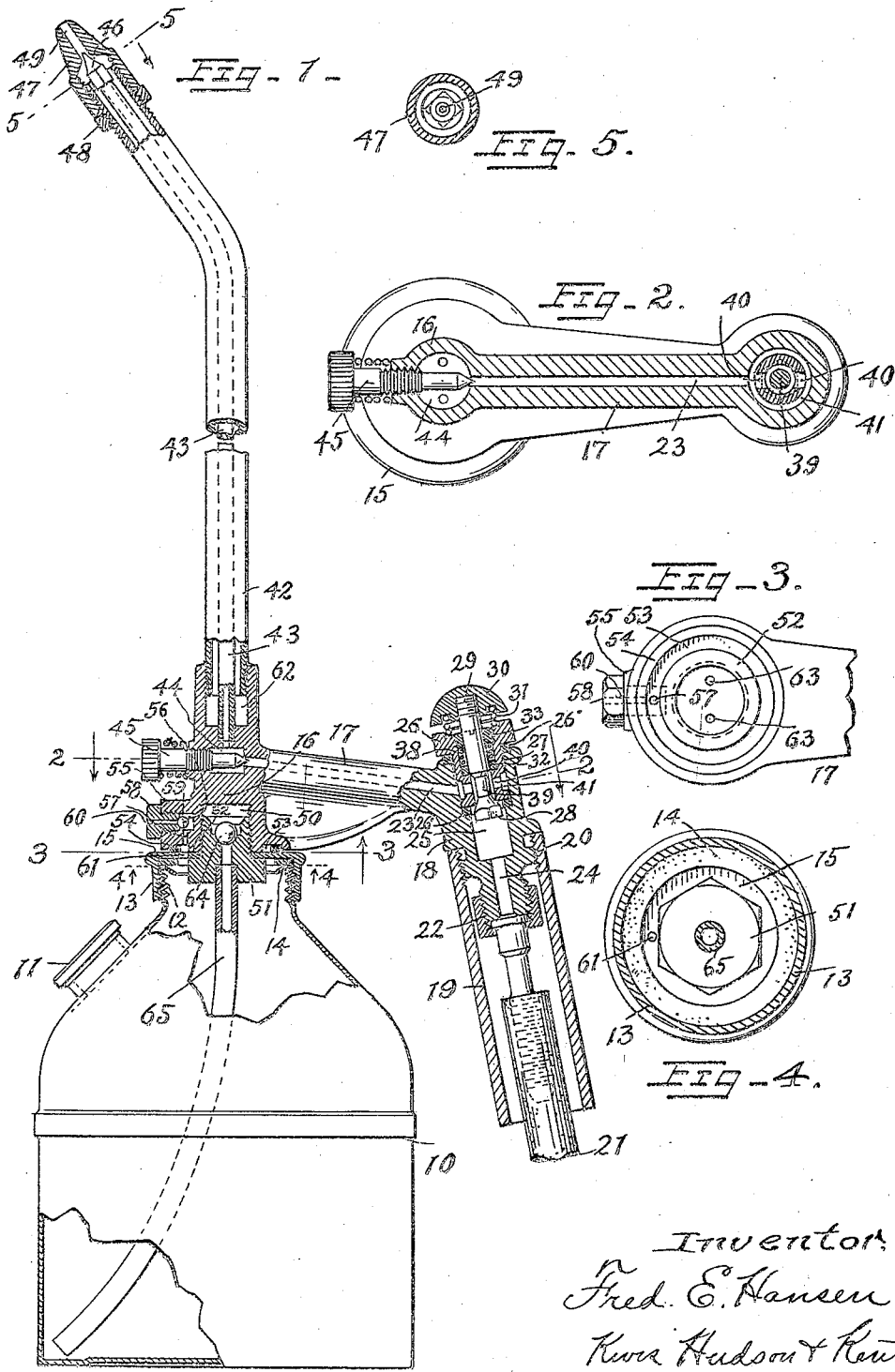

1,873,398

UNITED STATES PATENT OFFICE

FRED E. HANSEN, OF CLEVELAND, OHIO, ASSIGNOR TO THE HANSEN MANUFACTURING COMPANY, OF CLEVELAND, OHIO, A CORPORATION OF OHIO

SPRAYING DEVICE

Application filed August 5, 1929. Serial No. 383,693.

This invention relates to spraying apparatus and more particularly to an apparatus that is adapted to be used for spraying lubricant on vehicle springs, and for other analogous uses.

It is an object of the invention to provide an efficient and comparatively inexpensive apparatus, for the purpose specified, that will be convenient to use and easy to control.

Other objects of the invention and the features of novelty will be apparent from the following description taken in connection with the accompanying drawing, of which—

Fig. 1 is a side elevation of an apparatus embodying my invention with certain parts shown in section and other parts broken away;

Fig. 2 is an enlarged section on the line 2—2 of Fig. 1;

Fig. 3 is an enlarged end view of the nozzle member as seen from the line 3—3 of Fig. 1;

Fig. 4 is an enlarged section on the line 4—4 of Fig. 1;

Fig. 5 is a section on the line 5—5 of Fig. 1.

Referring to the drawing, 10 indicates a liquid container having a filler opening that is closed by a plug 11. The container 10 has a screw-threaded neck 12 on which there is a cap 13, a gasket 14 being arranged between the end of the neck 12 and the inner surface of the end wall 15 of the cap. A nozzle member comprising a body 16 having a lateral extension 17 is secured to the cap 13, as will be hereinafter described. The extension 17 has an offset 18 on which a tubular handle 19 is threaded, as indicated at 20. An air supply pipe 21 is secured to the offset 18, and within the handle 19, as indicated at 22, by any suitable form of coupling. There is a passage 23 through the extension 17 and a passage 24 in the offset 18, these two passages merging into an enlarged chamber 25. A sleeve 26 is secured to the offset 18 by the threads 27 and carries a valve 28 which cooperates with a seat at the inner end of the sleeve. Leakage of air around the sleeve is prevented by the gasket 26'. The valve 28 has a stem 29, on the outer end of which is a button 30 that is adapted to be actuated by the thumb of the operator when his hand grips the handle 19.

A spring 31 is arranged between the inner side of the button 30 and the outer end of the sleeve 26 and normally closes the valve 28 so as to prevent air from flowing from the supply pipe 21 to the passage 23. The sleeve 26 carries a packing ring 32, which surrounds the stem 29, and a ring nut 33 also surrounds the stem 29 and has a threaded connection with the sleeve 26. A spring 38 is arranged between the packing 32 and the nut 33 and is adapted to be tightly compressed to force the packing into tight engagement with the stem 29 so as to prevent air leakage.

The valve stem 29 has a reduced diameter, as indicated at 39, and this provides an annular space, within the sleeve 26, adapted to receive the air that passes the valve 28. Lateral openings 40 establish communication between this annular space and a groove 41 in the outer surface of the sleeve 26 and this groove registers with the passage 23 so that the air passing the valve 28 will be permitted to flow into the passage 23.

Two concentric tubes 42 and 43 are secured to the body 16 of the nozzle member by screw-threads, or in any other suitable manner, and the inner tube 43 has communication with a space 44, in the body 16. A needle valve 45 is arranged in the body 16 for the purpose of regulating the flow of air from the passage 23 to the space 44. The tube 43 conveys the air to the nozzle tip where it is discharged through the port 46. A tip 47 has threaded engagement with the outer end of the tube 42 so as to be adjustable with relation to the tip, having the port 46 therein, and the tip 47 may be secured in any position to which it is adjusted, by means of the lock nut 48. The space within the tip 47 communicates with the annular space between the tubes 42 and 43 and the air is mixed in this space with liquid from the container 10, and the mixture discharged through the opening 49.

The cap 13 has a central opening in its end wall 15 and the adjacent end of the body 16 has a threaded recess 50 with which a nut 51 cooperates. The nut 51 passes through the central opening in the wall 15 and clamps the cap against the end surface 52 of the body member 16. This end surface has an annular recess 53 therein, in which a gasket 54 is arranged. There is a boss 55 on the body member 16, in which there is a threaded recess 56, and a port 57 connects this recess with the annular recess 53. This arrangement permits the cap 13 to be rotated to any desired position, relative to the body member 16, so that the container 10 may be so positioned that the filler plug 11 may be located wherever desired about the axis of the nozzle member. For each position in which the cap is arranged there will be a certain location of the filler plug 11 when the container neck has been screwed tightly into the cap and it is important to have the cap 13 so arranged that the filler plug 11 will be in a convenient position for filling the container 10. It will be understood, of course, that the cap 13 can be rotated only when the nut 51 is loosened but when the desired position of the cap has been determined, it may be secured in this position by tightening the nut 51.

A plug 58 is screwed into the threaded recess 56 and has at its inner end a seat for the ball check valve 59 which is adapted to close the port 60 in the plug 58. There is a port 61, through the end wall of the cap 13, which establishes communication between the interior of the container 10 and the annular recess 53. When the apparatus is used for spraying, air is drawn into the container 10, through the ports 57, 60 and 61, to relieve the vacuum that would otherwise be created in the container and the valve 59 prevents leakage of the liquid out through these ports whenever the apparatus is turned up on its side.

The body member 16 has a chamber 62 that communicates with the annular space between the tubes 42 and 43 and ports 63 are provided on opposite sides of the space 44 for establishing communication between the chambers 50 and 62. The nut 51 has a seat for the ball check valve 64 and carries a tube 65 which extends to a point adjacent the bottom of the container 10 so that the liquid will be drawn through this tube into the nozzle member and thus practically all of the liquid in the container may be utilized.

In the operation of the apparatus, the tip 47 is directed toward the object to be sprayed and the operator depresses the button to open the valve 28. This admits air to the nozzle member and the suction created by the stream of air that is discharged through the opening 46, in the tip, creates a vacuum within the tube 42 which, in turn, draws the liquid up through the tube 65 and the ports 63 to the interior of the tip 47 where it meets the jet of air and is carried out in the form of a fine spray. When the button 30 is released by the operator, the flow of air is stopped but the liquid is prevented from returning from the nozzle to the container by the check valve 64 so that when the valve 28 is again opened the nozzle member will be full of liquid and the spraying operation will be restarted instantly. As previously stated the interior of the container 10 is vented by air entering the port 60 and the valve 59 will prevent leakage of the liquid from the container through this vent. The needle valve 45 may be adjusted to regulate the discharge of air through the nozzle member and the spraying mixture may be further adjusted by means of the tip 47.

Having thus described my invention what I claim is:

1. In a device of the class described, the combination of a liquid container having a screw-threaded attaching neck, a screw-threaded cap for said neck having an opening in its end wall, a nozzle member swivelled with respect to said cap and having an end surface adapted to be positioned against the outer surface of said end wall, a nut having a threaded connection with said nozzle member and adapted to clamp said cap to said nozzle member with the cap and nozzle member in any desired relative angular arrangement, a tube extending from said nozzle member to the bottom of said container, said cap having a vent opening in its end wall, means in said nozzle member for supplying air to said vent opening, a check valve in the last mentioned means for preventing liquid from flowing therethrough from said container, and valve controlled means for supplying pressure fluid to said nozzle member.

2. In a device of the class described, the combination of a liquid container having a screw-threaded attaching neck, a screw-threaded cap for said neck having an opening in its end wall, a nozzle member swivelled with respect to said cap and having an end surface adapted to be positioned against the outer surface of said end wall and a threaded recess in registration with said opening in the cap, a nut engaging said threaded recess and having a shoulder for engaging the inner surface of the end wall of the cap to secure the cap against said surface of the nozzle member in any desired relative angular arrangement, said nut having an opening therethrough and a check valve for preventing flow of liquid from the nozzle member to said container, a tube carried by said nut and extending to the bottom of said container, means for venting said container including an annular recess in said nozzle member concentric with the axis on which the nozzle member is swivelled, a thin opening in said cap member in alignment with said annular recess and a vent opening in said nozzle member connected to said annular recess, and means for supplying pressure fluid to said nozzle member.

3. In a device of the class described, the combination of a nozzle member having an end surface provided with an annular recess concentric with the axis on which the nozzle member is swivelled, a liquid container having a screw-threaded neck, a cap on said neck swivelled with respect to said nozzle member and having an end surface adapted to abut said end surface on the nozzle member, means for clamping said surfaces together and adapted to permit said cap to be adjusted to different positions angularly with respect to said nozzle member, the end wall of said cap having a vent opening in alignment with said recess in the nozzle member, a gasket arranged in the last mentioned recess and engaging said end wall of the cap exteriorly of said vent opening, means in said nozzle member for venting said recess, and a check valve in the last mentioned venting means for preventing liquid from flowing therethrough from said container.

In testimony whereof, I hereunto affix my signature.

FRED E. HANSEN.